US007551590B2

(12) United States Patent
Haller et al.

(10) Patent No.: US 7,551,590 B2
(45) Date of Patent: Jun. 23, 2009

(54) WIRELESS DEVICE HAVING A SINGLE PROCESSOR IN A SHORT-RANGE RADIO NETWORK

(75) Inventors: Amit Haller, Belmont, CA (US); Peter Fornell, Lake Oswego, OR (US); Avraham Itzchak, Ra' anana (IL); Amir Glick, Tel Aviv (IL); Ziv Haparnas, Tel Aviv (IL)

(73) Assignee: IXI Mobile (R&D), Ltd. (IL)

( * ) Notice: Subject to any disclaimer, the term of this patent is extended or adjusted under 35 U.S.C. 154(b) by 363 days.

(21) Appl. No.: 10/165,150

(22) Filed: Jun. 6, 2002

(65) Prior Publication Data

US 2002/0165006 A1      Nov. 7, 2002

Related U.S. Application Data

(63) Continuation of application No. 09/850,399, filed on May 7, 2001, now Pat. No. 7,039,033.

(51) Int. Cl.
*H04Q 7/24* (2006.01)
(52) U.S. Cl. ....................................... 370/338; 370/401
(58) Field of Classification Search ......... 370/328–339, 370/463; 375/140, 219; 455/424–426.1
See application file for complete search history.

(56) References Cited

U.S. PATENT DOCUMENTS 5,442,680 A      8/1995   Schellinger et al.

(Continued)

FOREIGN PATENT DOCUMENTS

EP          0 735 789 A      10/1996

(Continued)

OTHER PUBLICATIONS

Biesecker, Broadband Wireless, Integrated Services, and Their Applications to Intelligent Transportation Systems, Center for Telecommunications and Advanced Technology, pp. 1-GL5, Jun. 2000.*

(Continued)

*Primary Examiner*—Frank Duong
(74) *Attorney, Agent, or Firm*—Century IP Group, Inc.; F. Jason Far-hadian, Esq.

(57) ABSTRACT

A system, a wireless hand-held device, and software component for accessing information responsive to short-range radio signals is provided. The system includes a wireless gateway device coupled to a network, such as a cellular network. The wireless gateway device includes a network manager software component for accessing information from the network responsive to a first short-range radio signal. The network may be a corporate, private or public network, such as the Internet. A first wireless device is coupled to the wireless gateway device. The first wireless device provides the first short-range radio signal. In an embodiment of the present invention, the first wireless device is a cellular telephone, personal digital assistant or thin terminal having a Bluetooth™ processor and transmitter. In an embodiment of the present invention, the network manager software component includes a plug and play software component for loading and executing software for the first wireless device. In an embodiment of the present invention, a second wireless device accesses information on the first wireless device using the wireless gateway device.

33 Claims, 9 Drawing Sheets

U.S. PATENT DOCUMENTS

| | | | |
|---|---|---|---|
| 5,457,737 A | 10/1995 | Wen | |
| 5,526,402 A * | 6/1996 | Dent et al. | 455/426.1 |
| 5,572,528 A | 11/1996 | Shuen | |
| 5,742,237 A | 4/1998 | Bledsoe | |
| 5,771,438 A | 6/1998 | Palermo et al. | |
| 5,774,791 A | 6/1998 | Strohallen et al. | |
| 5,793,763 A | 8/1998 | Mayes et al. | |
| 5,838,252 A | 11/1998 | Kikinis | |
| 5,896,369 A | 4/1999 | Warsta et al. | |
| 5,929,848 A | 7/1999 | Albukerk et al. | |
| 5,978,386 A | 11/1999 | Hamalainen et al. | |
| 5,987,011 A | 11/1999 | Toh | |
| 5,987,033 A | 11/1999 | Boer et al. | |
| 6,028,853 A * | 2/2000 | Haartsen | 370/338 |
| 6,061,346 A * | 5/2000 | Nordman | 370/352 |
| 6,064,734 A | 5/2000 | Hasegawa et al. | |
| 6,067,291 A | 5/2000 | Kamerman et al. | |
| 6,069,896 A | 5/2000 | Borgstahl et al. | |
| 6,078,789 A | 6/2000 | Bodenmann et al. | |
| 6,085,098 A | 7/2000 | Moon et al. | |
| 6,108,314 A * | 8/2000 | Jones et al. | 370/294 |
| 6,130,602 A | 10/2000 | O'Toole et al. | |
| 6,151,628 A | 11/2000 | Xu et al. | |
| 6,218,958 B1 | 4/2001 | Eichstaedt et al. | |
| 6,223,029 B1 | 4/2001 | Stenman et al. | |
| 6,243,581 B1 | 6/2001 | Jawanda | |
| 6,265,788 B1 | 7/2001 | Davidson et al. | |
| 6,282,183 B1 | 8/2001 | Harris et al. | |
| 6,298,443 B1 | 10/2001 | Colligan et al. | |
| 6,326,926 B1 | 12/2001 | Shoobridge et al. | |
| 6,333,973 B1 | 12/2001 | Smith et al. | |
| 6,343,276 B1 | 1/2002 | Barnett | |
| 6,434,537 B1 | 8/2002 | Grimes | |
| 6,446,127 B1 | 9/2002 | Schuster et al. | |
| 6,459,882 B1 | 10/2002 | Palermo et al. | |
| 6,487,180 B1 | 11/2002 | Borgstahl et al. | |
| 6,519,460 B1 | 2/2003 | Haartsen | |
| 6,532,366 B1 | 3/2003 | Chung et al. | |
| 6,577,622 B1 * | 6/2003 | Schuster et al. | 370/352 |
| 6,590,928 B1 * | 7/2003 | Haartsen | 375/134 |
| 6,600,428 B1 | 7/2003 | O'Toole et al. | |
| 6,600,734 B1 | 7/2003 | Gernert | |
| 6,630,925 B1 | 10/2003 | Ostergård et al. | |
| 6,633,759 B1 | 10/2003 | Kobayashi | |
| 6,636,489 B1 | 10/2003 | Fingerhut | |
| 6,665,549 B1 | 12/2003 | Reed | |
| 6,757,269 B2 * | 6/2004 | Dorenbosch et al. | 370/338 |
| 6,853,851 B1 * | 2/2005 | Rautiola et al. | 455/553.1 |
| 2002/0037700 A1 | 3/2002 | Dooley et al. | |
| 2002/0055333 A1 | 5/2002 | Davies et al. | |
| 2002/0058502 A1 | 5/2002 | Stanforth | |
| 2002/0065817 A1 | 5/2002 | Ito et al. | |
| 2002/0068559 A1 | 6/2002 | Sharma et al. | |
| 2002/0068600 A1 | 6/2002 | Chihara et al. | |
| 2002/0069037 A1 | 6/2002 | Hendrickson et al. | |
| 2002/0082054 A1 | 6/2002 | Keinonen et al. | |
| 2002/0086718 A1 | 7/2002 | Bigwood et al. | |
| 2002/0091633 A1 | 7/2002 | Proctor | |
| 2002/0102974 A1 | 8/2002 | Raith | |
| 2002/0118663 A1 | 8/2002 | Dorenbosch et al. | |
| 2002/0128051 A1 | 9/2002 | Liebenow | |
| 2002/0142762 A1 | 10/2002 | Chmaytelli et al. | |
| 2002/0143952 A1 | 10/2002 | Sugiarto et al. | |
| 2002/0155830 A1 | 10/2002 | Iyer | |
| 2002/0160764 A1 | 10/2002 | Gorsuch | |
| 2003/0013438 A1 | 1/2003 | Darby | |
| 2003/0017810 A1 | 1/2003 | Janninck et al. | |
| 2003/0027563 A1 | 2/2003 | Herle et al. | |
| 2003/0032417 A1 | 2/2003 | Minear et al. | |
| 2003/0050058 A1 | 3/2003 | Walsh et al. | |
| 2003/0060188 A1 | 3/2003 | Gidron | |
| 2003/0060189 A1 | 3/2003 | Minear et al. | |
| 2003/0078036 A1 | 4/2003 | Chang et al. | |
| 2003/0091017 A1 | 5/2003 | Davenport et al. | |
| 2003/0115351 A1 | 6/2003 | Giobbi | |
| 2003/0122856 A1 | 7/2003 | Hubbard | |
| 2003/0153280 A1 | 8/2003 | Kopp et al. | |
| 2003/0187807 A1 | 10/2003 | Matsubara et al. | |
| 2003/0214940 A1 | 11/2003 | Takken | |
| 2003/0224773 A1 | 12/2003 | Deeds | |
| 2003/0232616 A1 | 12/2003 | Gidron et al. | |
| 2004/0048671 A1 | 3/2004 | Rowe | |

FOREIGN PATENT DOCUMENTS

| | | |
|---|---|---|
| EP | 0 766 490 A | 4/1997 |
| JP | 3153213 | 4/2001 |
| WO | WO 95/08900 A | 3/1995 |
| WO | WO 97 34429 A | 9/1997 |
| WO | WO 97 36442 A | 10/1997 |
| WO | WO 98/17032 A | 4/1998 |
| WO | WO 98 15143 A | 9/1998 |
| WO | WO 99/48315 | 9/1999 |
| WO | WO 99 48315 A | 9/1999 |
| WO | WO 00/77620 A | 12/2000 |

OTHER PUBLICATIONS

Collins et al, Mitsubishi Materials Corporation Enters Wireless Data Communications Market With New IP-based Network Technology Designed to Provide Low-cost, High Speed, Mobile Internet Access, Semiseeknews, pp. 1-3, Dec. 14, 2000.*

Yee et al., "Integrating Bluetooth With Wireless And Ricocheting", pp. 1310-1314, 2000 IEEE.

Haartsen, "Bluetooth—The universal radio interface for ad hoc wireless connectivity", pp. 110-117, Ericsson Review No. 3, 1998.

White Paper, Handheld Devices: Comparing the Major Platforms, www.dell.com/r&d, Dec. 2000.

Miyatsu, Bluetooth Design Background and Its Technological Features, IEICE Trans, Fundamentals, vol. E83-A, No. 11, Nov. 2000.

Parekh, Operating Systems on Wireless Handheld Devices, A Strategic Market Analysis, Massachusettes Institute of Technology, Sep. 28, 2000.

Johansson, et al., Short Range Radio Based Ad-hoc Netowrking: Performance and Properties, IEEE, 1999.

Guthery et al., "The WebSIM—Clever Smartcards Listen to Port 80", Version 15.12.99.

Project P946-GI, Smart Devices "When Things Start to Think", Jan. 2000, 2000 Eurescom Participants in Project P946-GI.

Haartsen J, "Blue tooth—The Universal Radio Interface for Ad Hoc, Wireless Connectivity", Ericsson Review, 1998, pp. 110-117, ISSN: 0014-0171, Ericsson, Stockholm, SE.

* cited by examiner

WIRELESS DEVICE HAVING A SINGLE PROCESSOR IN A SHORT-RANGE RADIO NETWORK

RELATED APPLICATION

This application is a continuation of U.S. patent application Ser. No. 09/850,399, entitled "A System, Device and Computer Readable Medium for Providing a Managed Wireless Network Using Short-Range Radio Signals," filed on May 7, 2001, now U.S. Pat. No. 7,039,033 which is incorporated herein by reference.

FIELD OF THE INVENTION

This invention relates generally to wireless devices in a wireless network using short-range radio signals.

BACKGROUND OF THE INVENTION

A user has numerous wireless devices for accessing and processing information. For example, a user may have a cellular telephone for communicating with others, a personal digital assistant ("PDA") for storing contact information, a laptop computer for storing and processing files, a digital camera for obtaining images and a pager for being contacted. Each one of these devices also may access remote information on a private or public network, such as the Internet. However, this system suffers from several disadvantages.

First, typically only a single device originates and can access the Internet at a time.

Second, Internet protocol ("IP") addresses are held while connected to the Internet. This can be expensive and use scarce IP address resources.

Third, each device requires its own security management, such as a Virtual Private Network ("VPN") and firewall software component.

Fourth, there is no ability to share, add to or manage the services of the numerous wireless devices. In particular, there is no communication between wireless devices. If a user obtains a wireless device having an additional service, such as extra persistence storage, other wireless devices typically are not capable of using the extra persistence storage.

Bluetooth™ technology (www.bluetooth.com) provides wireless communications between devices. Yet, Bluetooth™ technology also suffers from many disadvantages. Bluetooth™ technology does not allow for a "plug and play" capability at a wireless device application level. In other words, a wireless device cannot merely be turned on and Bluetooth™ technology recognizes it and establishes a communication protocol. If a user desires a wireless device to communicate with a Bluetooth™ technology device, the added wireless device must have software drivers and applications loaded to operate. Otherwise, the Bluetooth™ technology device is not able to communicate with the newly added wireless device. This makes it difficult to add new functionality or types of wireless devices. Bluetooth™ technology does not provide an open environment for software programmers to provide application software components for wireless devices. Further, Bluetooth™ technology does not allow devices to share information and resources at an application level.

Therefore, it is desirable to provide a system of wireless devices which can effectively communicate with each other and access information on the Internet. The system of wireless devices should efficiently use IP resources and security management. The wireless devices should effectively share and manage services and allow for seamless plug and play capability. The system should allow for new functionality and types of wireless devices.

SUMMARY OF THE INVENTION

A system, coupled to a cellular network, provides access to the Internet according to an embodiment of the present invention. The system comprises a wireless gateway device, coupled to the cellular network, having a network manager software component for accessing information from the Internet responsive to a first short-range radio signal. A first wireless device is coupled to the wireless gateway device. The first wireless device provides the first short-range radio signal.

According to an embodiment of the present invention, the first wireless device is selected from a group consisting of a desktop computer, a laptop computer, a personal digital assistant, a headset, a printer, a pager, a watch, digital camera and an equivalent thereof.

According to an embodiment of the present invention, the wireless gateway device is a cellular telephone using a Global System for Mobile communications ("GSM") protocol.

According to an embodiment of the present invention, the wireless gateway device is a cellular telephone using a Code Division Multiple Access ("CDMA") protocol.

According to an embodiment of the present invention, the wireless gateway device is a cellular telephone using a Time Division Multiple Access ("TDMA") protocol.

According to an embodiment of the present invention, the first wireless device is a thin terminal.

According to an embodiment of the present invention, the first wireless device includes a Bluetooth™ processor having a 2.4 GHZ transmitter.

According to an embodiment of the present invention, the wireless gateway device includes a Bluetooth™ processor having a 2.4 GHZ transmitter.

According to an embodiment of the present invention, the network manager software component includes a plug and play software component for loading and executing software for the first wireless device.

According to an embodiment of the present invention, the network manager software component includes a PIN number management software component for obtaining and supplying PIN numbers.

According to embodiment of the present invention, the network manager software component includes a service repository software component for obtaining and providing an availability of a service from the first wireless device.

According to an embodiment of the present invention, the first wireless device includes an application software component for providing a service. The network manager software component includes a management software component for accessing the service.

According to an embodiment of the present invention, the system further comprises a second wireless device coupled to the wireless gateway device. The second wireless device provides a short-range signal. The first wireless device communicates with the second wireless device through the wireless gateway device.

According to an embodiment of the present invention, the system further comprises a second wireless device coupled to the wireless gateway device. The wireless gateway device provides access to the Internet for the first and second wireless devices.

According to an embodiment of the present invention, the network manager software component operates with an operating system software component.

According to an embodiment of the present invention, the operating system component is a Linux, EPOC or a PocketPC operating system.

According to an embodiment of the present invention, the wireless gateway device includes 1) an application software component for providing a service, and 2) an application server software component coupled to the network management software component.

According to an embodiment of the present invention, the wireless gateway device further includes a firewall software component.

According to an embodiment of the present invention, the wireless gateway device includes a VPN software component.

According to an embodiment of the present invention, a hand-held device for providing a personal area network is provided. The hand-held device comprises a storage device coupled to a processor. The storage device stores a software component for controlling the processor. The processor operates with the component to provide a short-range radio Internet protocol communication between the first hand-held wireless device and a second hand-held wireless device.

According to an embodiment of the present invention, a Bluetooth™ transmitter is coupled to the processor.

According to an embodiment of the present invention, a GSM transmitter is coupled to the processor.

According to an embodiment of the present invention, a wireless hand-held device accesses a router in a personal network. The wireless hand-held device comprises a storage device coupled to a processor. The storage device stores a software component for controlling the processor. The processor operates with the component to provide a first short-range radio signal to the router for accessing the Internet and a second short-range radio signal to the router for accessing another wireless hand-held device.

According to an embodiment of the present invention, an article of manufacture, including a computer readable medium is provided. The article of manufacture comprises an application software component for providing a service. An application server software component provides the application software component. The article of manufacture also includes an Internet protocol network manager software component and an operating system software component. Also, a short-range radio software component for providing a short-range radio signal and a cellular software component for providing a communications signal to a cellular network is included with the article of manufacture.

Other aspects and advantages of the present invention can be seen upon review of the figures, the detailed description, and the claims that follow.

BRIEF DESCRIPTION OF THE FIGS.

Figure 3A:
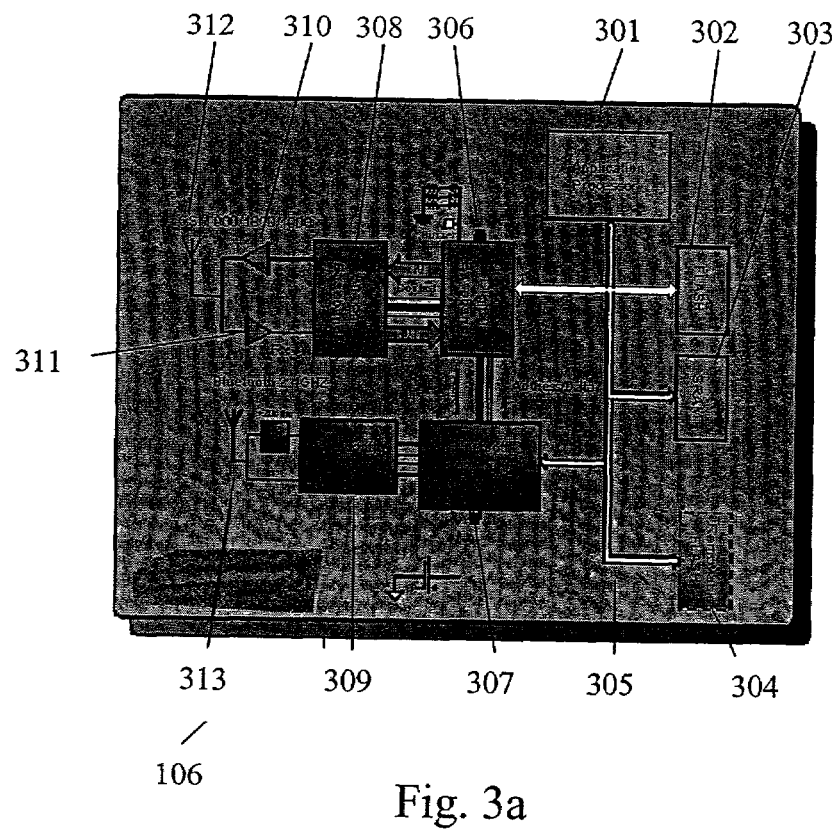
Figure 3B:
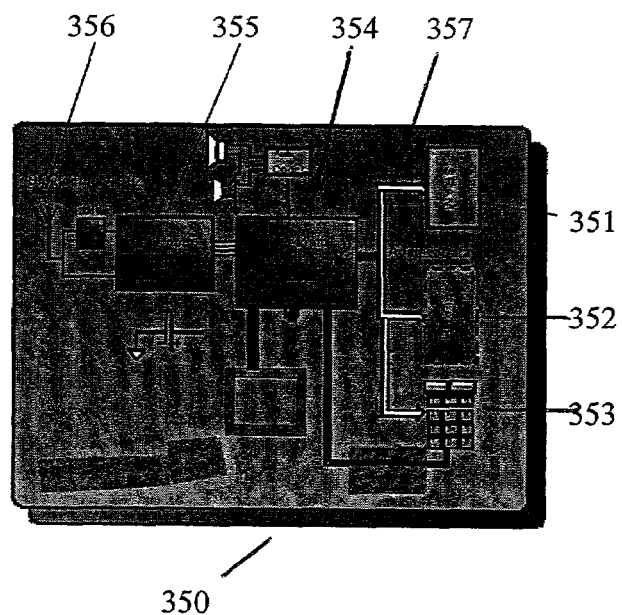

FIGS. 3a-b are hardware block diagrams of a wireless gateway device and wireless handheld device according to an embodiment of the present invention.

Figure 4:
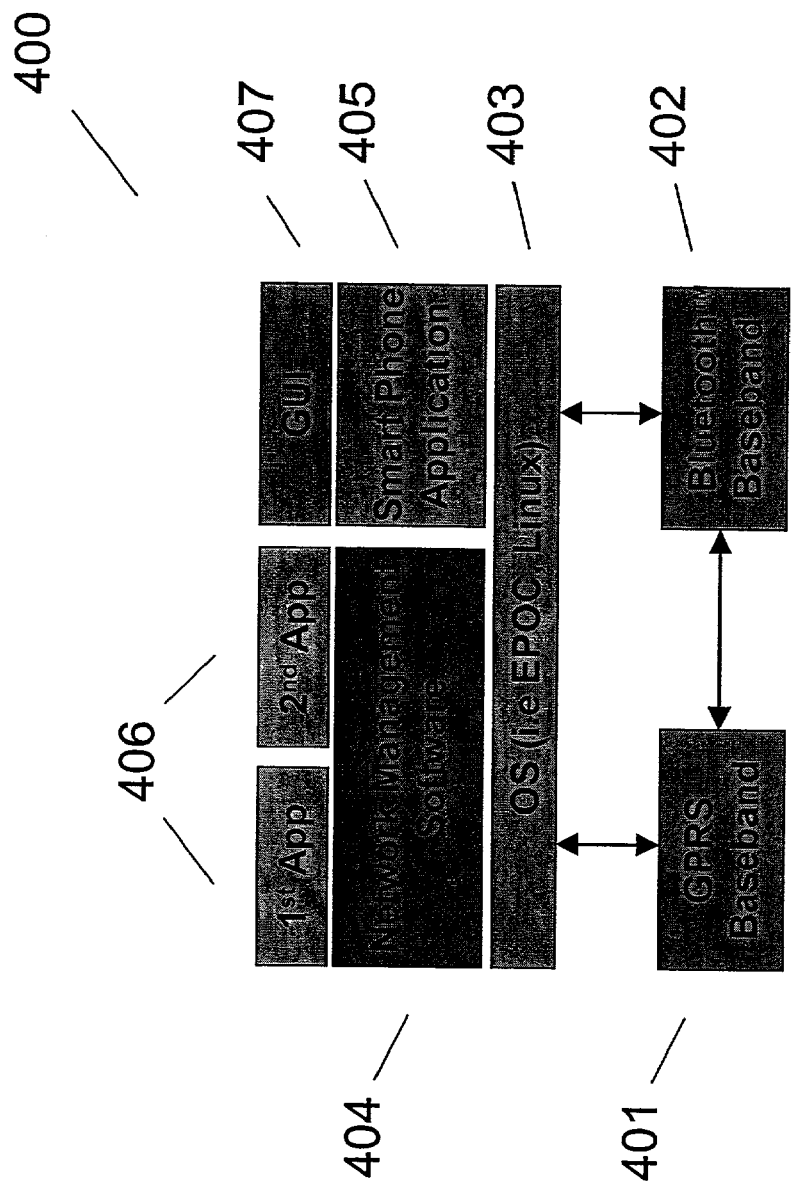
Figure 5A:
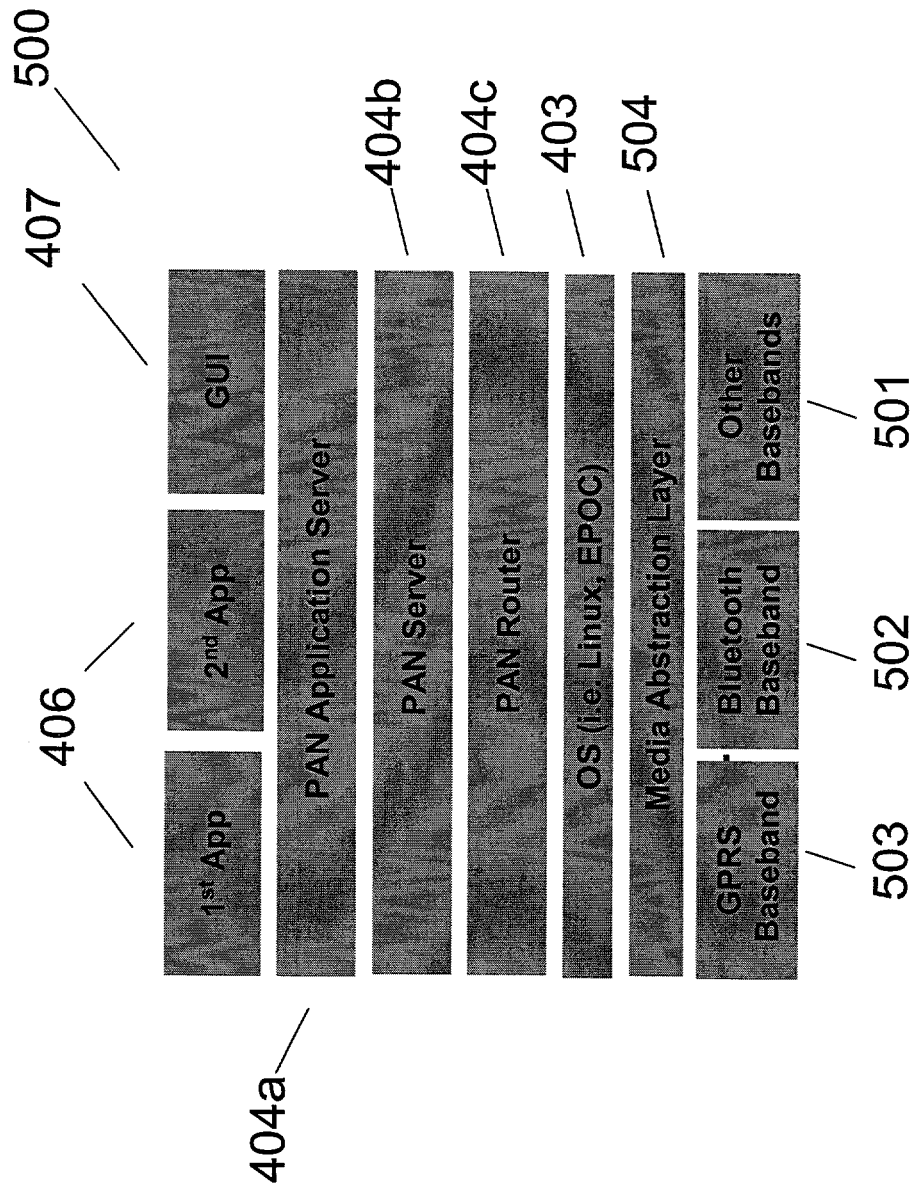
Figure 5B:
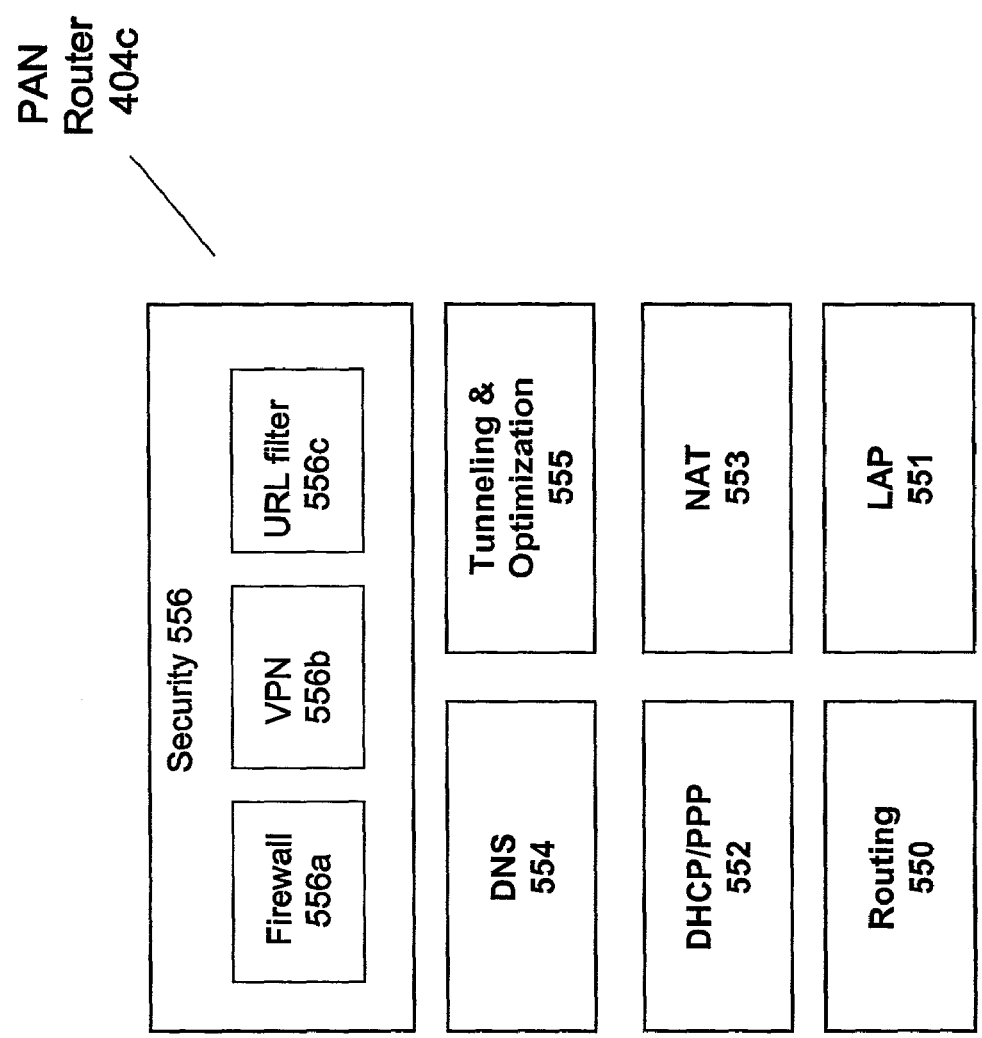

FIGS. 4 and 5a-b are software block diagrams for a wireless gateway device according to an embodiment of the present invention.

Figure 6:
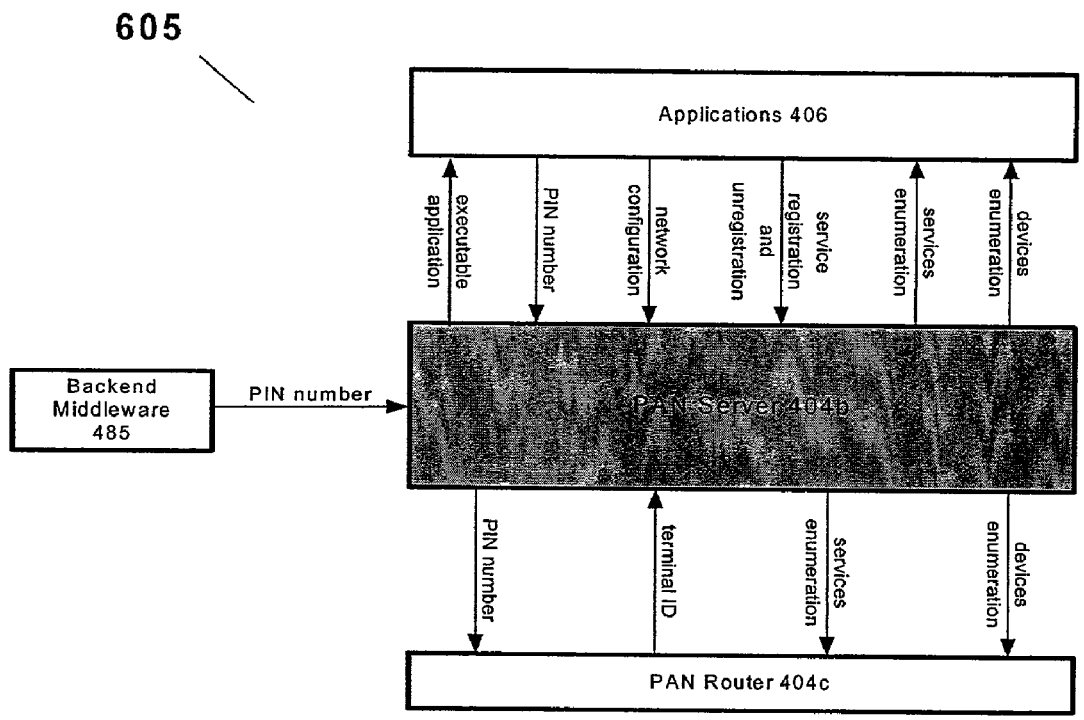

FIG. 6 illustrates network management software interfaces according to an embodiment of the present invention.

Figure 7:
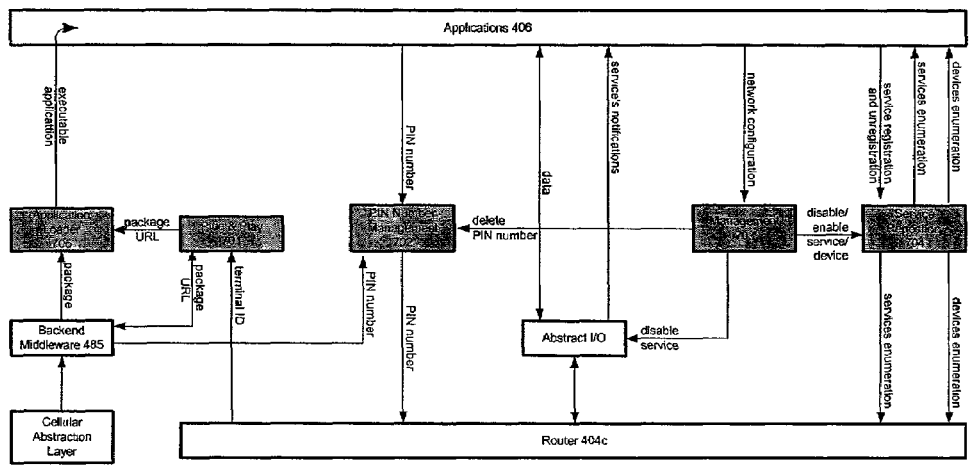

FIG. 7 illustrates network management software components according to an embodiment of the present invention.

Figure 8:
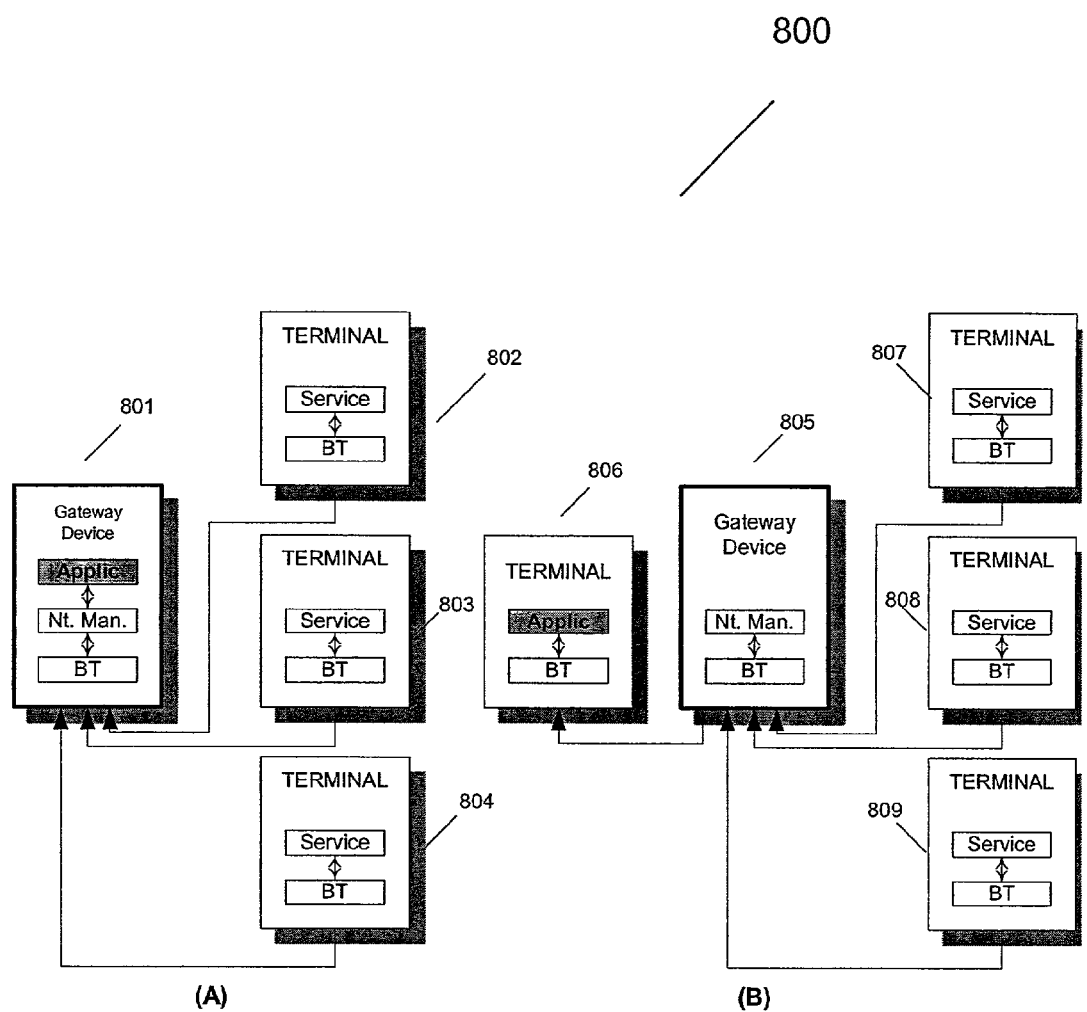

FIGS. 8a-b illustrate multiple wireless devices coupled to a wireless gateway device according to an embodiment of the present invention.

DETAILED DESCRIPTION

I. System Overview

The following description and claims relate to a system that accesses information from a wide area network ("WAN"), such as the Internet, and local wireless devices in response to short-range radio signals. The network may also be an IP based public or private network, such as a corporate secured network using VPN.

Figure 1:
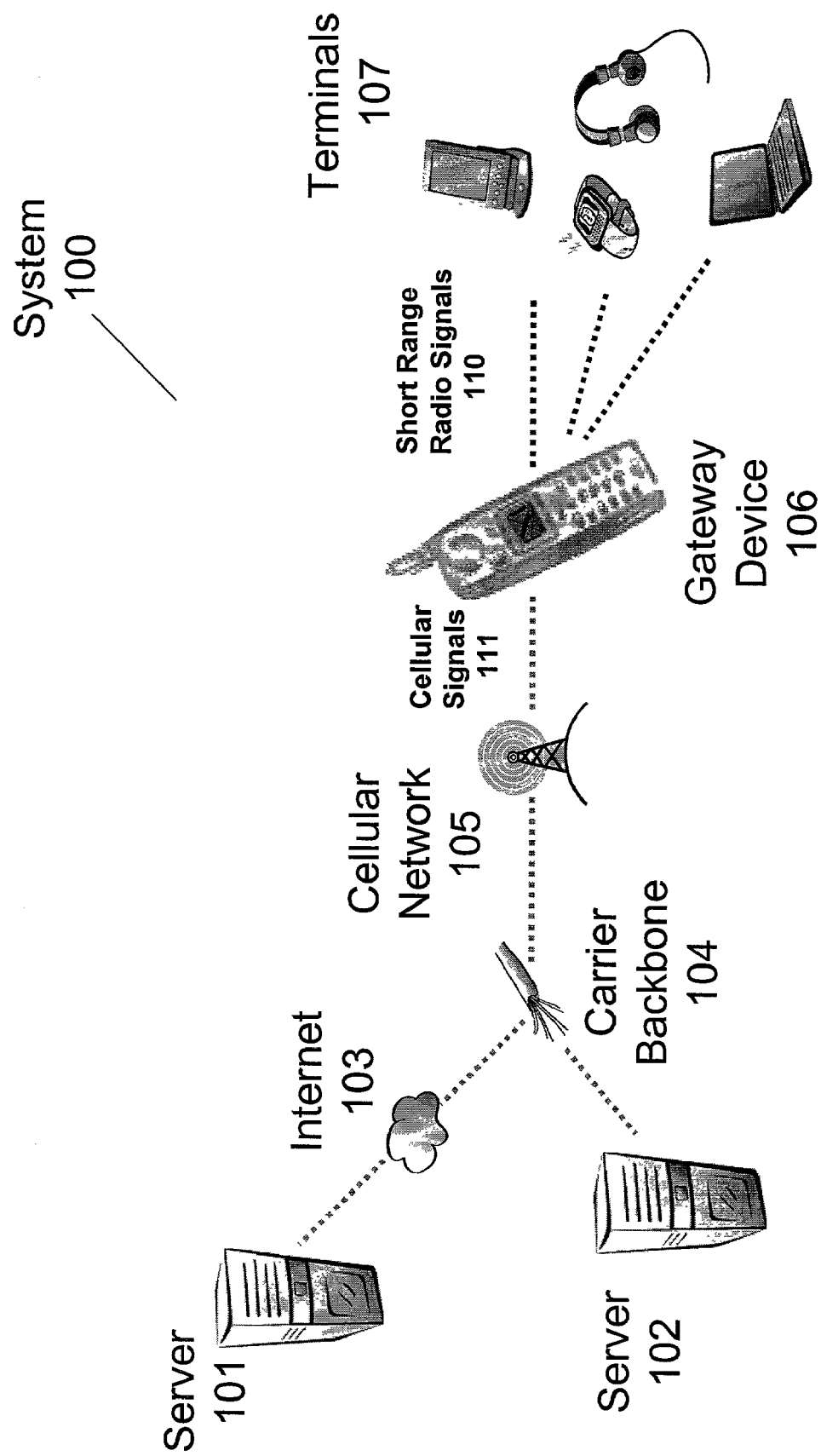
FIG. 1 illustrates a system according to an embodiment of the present invention.

FIG. 1 illustrates system 100 according to an embodiment of the present invention. System 100 includes terminals 107 coupled to wireless gateway device 106. In an embodiment of the present invention, gateway device 106 and one or more terminals 107 communicate to form a personal area network ("PAN"). In an embodiment of the present invention, terminals 107 are coupled to gateway device 106 by short-range radio signals 110. In an embodiment of the present invention, terminals 107 are a desktop computer, a laptop computer, a personal digital assistant, a headset, a pager, a printer, a watch, thin terminal, digital camera or an equivalent thereof. In an embodiment of the present invention, terminals 107 include a Bluetooth™ 2.4 GHz transmitter/receiver. Likewise, gateway device 106 includes a Bluetooth™ 2.4 GHZ transmitter/receiver. In an alternate embodiment of the present invention, a Bluetooth™ 5.7 GHZ transmitter/receiver is used. Gateway device 106 and terminals 107 hardware are illustrated in FIGS. 3a-b.

In alternate embodiments of the present invention, other local wireless technologies such as 802.11 or HomeRF signals are used to communicate between gateway device 106 and terminals 107.

In an embodiment of the present invention, gateway device 106 is coupled to cellular network 105 by cellular signals 111 using a protocol, such as a Global and System for Mobile communications ("GSM ") protocol. In alternate embodiments, a Code Division Multiple Access ("CDMA"), CDMA 2000 or Time Division Multiple Access ("TDMA"), or General Packet Radio Service ("GPRS") protocol is used.

In an alternate embodiment of the present invention, gateway device 106 is coupled to a landline network by an Ethernet, Digital Subscriber Line ("DSL"), or cable modem connection, singly or in combination.

In an embodiment of the present invention, gateway device 106 is a cellular telephone.

Cellular network 105 is coupled to a wireless carrier internal network or carrier backbone 104. In an embodiment of the present invention, server 102 is coupled to carrier backbone 104. In an alternate embodiment of the present invention, carrier backbone 104 is coupled to Internet 103. Server 101 is coupled to Internet 103. In an embodiment of the present invention, servers 101 and 102 provide information, such as web pages or application software components to terminals 107 by way of gateway device 106. In an embodiment of the present invention, terminals 107 share services and communicate by way of gateway device 106.

II. Gateway/Handheld Device Hardware

Figure 2:
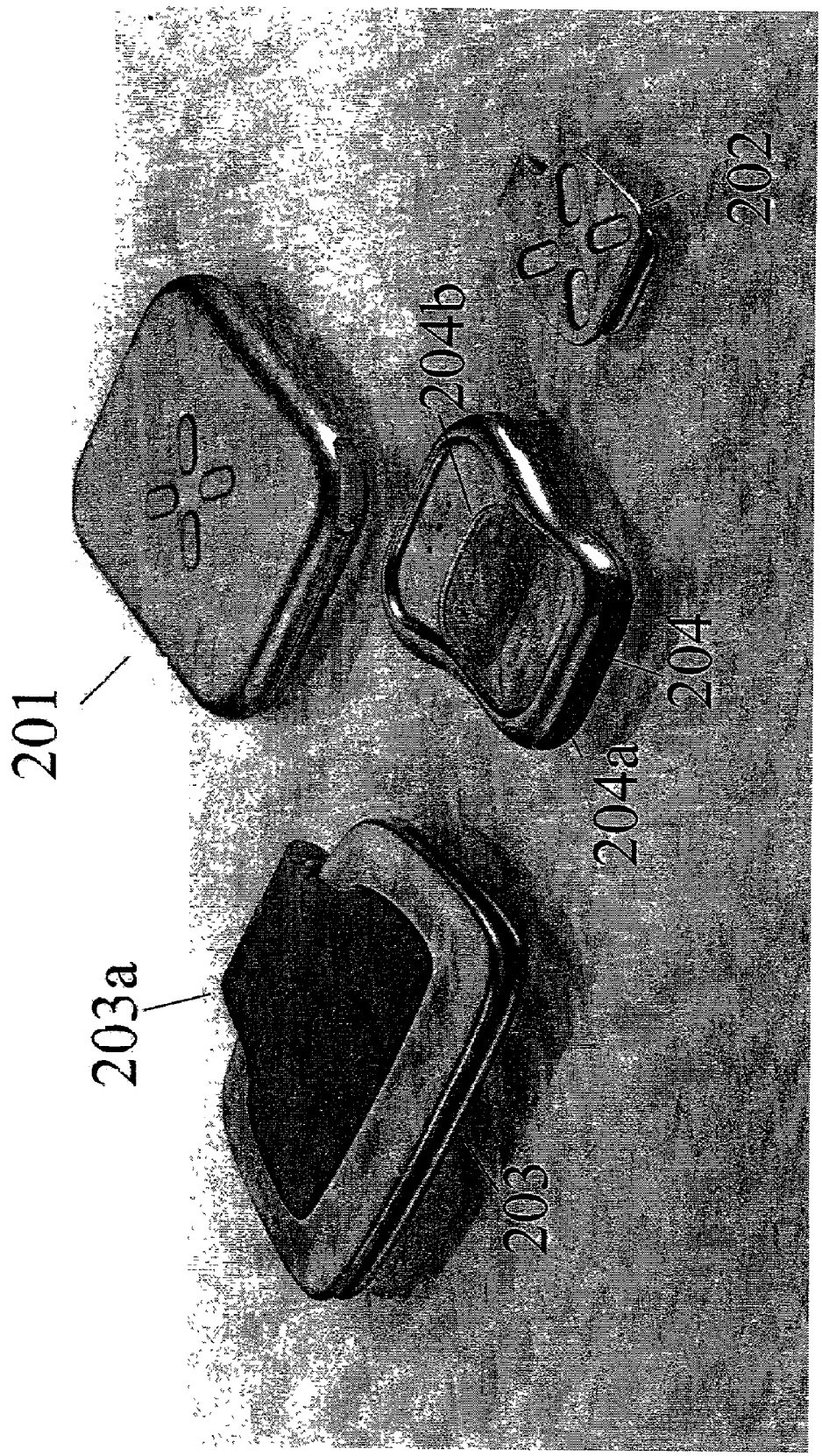
FIG. 2 illustrates thin terminals and a wireless gateway device according to an embodiment of the present invention.

FIG. 2 illustrates terminals 107. In an embodiment of the present invention, there are two types of terminals: 1) Smart terminals and 2) Thin terminals. Smart terminals have a relatively powerful central processor, operating system and applications. Their main needs from a PAN are access to a WAN through TCP/IP and other network services such as storage and execution. For example, a computer notebook and PDA are smart terminals. Thin terminals have a relatively low power central processor and operating system. They are mainly used as peripherals to an Application server in a PAN and their main task is user interaction, rendering output for a user and providing an Application server with a user's input. For example, a watch or a messaging terminal are thin terminals.

FIG. 2 illustrates thin terminals. Voice terminal 204 includes a display 204b and a retractable keypad 204a. Messaging Terminal 203 is illustrated in a closed position with a hinge 203a used to open and close terminal 203. Terminal 203 also includes a miniature QWERTY keyboard and display when opened. Gateway device 201 includes clip 202 for a belt.

In an embodiment, PMG device 201 is also illustrated in FIG. 2.

FIG. 3a illustrates a hardware block diagram of gateway device 106 in an embodiment of the present invention. Gateway device 106 includes both internal and removable memory. In particular, gateway device 106 includes internal FLASH (or Electrically Erasable Programmable Read-Only Memory ("EEPROM") and static Random Access Memory ("SRAM") memory 302 and 303, respectively. Removable FLASH memory 304 is also used in an embodiment of the present invention. Memories 302, 303, and 304 are coupled to bus 305. In an embodiment of the present invention, bus 305 is an address and data bus. Application processor 301 is likewise coupled to bus 305. In an embodiment of the present invention, processor 301 is a 32 bit processor.

Bluetooth™ processor 307 is also coupled to bus 305. Bluetooth™ RF circuit 309 is coupled to Bluetooth™ processor 307 and antenna 313. Processor 307, RF circuit 309 and antenna 313 transmit and receive short-range radio signals to and from terminals 107 illustrated in FIG. 1, or device 350 illustrated in FIG. 3b.

Cellular, such as GSM, signals are transmitted and received using digital circuit 306, analog circuit 308, transmitter 310, receiver 311 and antenna 312. Digital circuit 306 is coupled to bus 305. In alternate embodiments, gateway device 106 includes a display, a speaker, a microphone, a keypad and a touchscreen, singly or in combination thereof.

FIG. 3b illustrates device 350 that is a hand-held device in an embodiment of the present invention. Device 350, in an embodiment of the present invention, is one of the terminals 107 illustrated in FIG. 1. Similar to gateway device 106, device 350 includes SRAM and FLASH memory 351 and 352, respectively. Memories 351 and 352 are coupled to bus 357. In an embodiment of the present invention, bus 357 is an address and data bus. Keypad 353 is also coupled to bus 357. Short-range radio signals are transmitted and received using Bluetooth™ processor 354 and Bluetooth™ RF circuit 355. Antenna 356 is coupled to Bluetooth™ RF circuit 355. In an embodiment of the present invention, antenna 356 transmits and receives short-range radio signals from gateway device 300. In alternate embodiments, device 350 includes a display, a speaker, a microphone, a keypad and a touchscreen, singly or in combination thereof.

III. Gateway Software

FIG. 4 illustrates a software architecture 400 for gateway device 106 illustrated in FIG. 3a according to an embodiment of the present invention. Gateway software 400 is stored in FLASH 302. In an embodiment of the present invention, software components referenced in FIGS. 4-7 represent a software program, a software object, a software function, a software subroutine, a software method, a software instance, a code fragment, singly or in combination. In an alternate embodiment, functions performed by software components illustrated in FIGS. 4-7 are carried out completely or partially by hardware.

In an embodiment of the present invention, gateway software 400, or components of gateway software 400, is stored in an article of manufacture, such as a computer readable medium. For example, gateway software 400 is stored in a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination. In yet another embodiment, gateway software 400, or components thereof, is downloaded from server 101 illustrated in FIG. 1.

Gateway software 400 includes telecommunication software or physical layer protocol stacks, in particular cellular communications software 401 and short-range radio communications software 402. In an embodiment, communication software 401 is a GPRS baseband software component used with processor 306 to transmit and receive cellular signals. In an embodiment, communication software 402 is a Bluetooth™ baseband software component used with processor 307 to transmit and receive short-range radio signals.

In an embodiment of the present invention, operating system 403 is used to communicate with telecommunications software 401 and 402. In an embodiment of the present invention, operating system 403 is a Linux operating system, EPOC operating system available from Symbian software of London, United Kingdom or a PocketPC or a Stinger operating system available from Microsoft of Redmond, Wash. Operating system 403 manages hardware and enables execution space for gateway device software components.

Network Management software 404 is used to provide a number of functions according to embodiments of the present invention: 1) routing, 2) device plug and play, 3) PIN number management, 4) network device management, and 5) service repository. In an embodiment of the present invention, network management software 404 is programmed in C++ software language.

Smart phone application software 405 communicates with operating system 403 and is used in a cellular telephone embodiment of the present invention.

1st and 2nd software application components 406 communicate with management software 404 and provide additional services to a user. For example, application components 406 may include: 1) a stock quote application for providing stock quotes, 2) a personal information manager application including calendars, to do lists, emails, or contacts, 3) a synchronization software application for synchronizing databases, 4) a telephony application for providing telephone services, or 5) a location application for providing a current location of a gateway device.

Furthermore, Graphics User Interface ("GUI") 407 is provided to allow a user-friendly interface.

FIG. 5a illustrates detailed gateway software architecture 500. In an embodiment of the present invention, network management software 404 illustrated in FIG. 4 includes three software components as illustrated in FIG. 5a:1) PAN router 404c; 2) PAN server 404b; and 3) Application server 404a. GPRS baseband 503 and Bluetooth™ baseband 502 are software components used to generate communication signals to a cellular network 105 and terminals 107 as illustrated in FIG. 1. In an alternate embodiment, other baseband software components 501 are used to generate communication signals.

Media abstraction layer 504 allows operating system 403 to communicate with basebands 503, 502 and 501, respectively. Media abstraction layer 504 and other abstraction layers, described herein, translate a particular communication protocol, such as GPRS, into a standard command set used by a gateway device and/or terminal. The purpose of an abstraction layer is to isolate the physical stacks from the rest of the gateway device software components. This enables future usage of different physical stacks without changing any of the upper layer software and allows the gateway device software to work with any communication protocol.

PAN router 404c establishes a PAN network, implementing communication primitives, IP networking, IP services and similar tasks.

PAN server 404b is responsible for implementing PAN oriented services such as plug and play, terminal enumeration, application loading, storage space and other services. In an embodiment, PAN server 404b communicates directly with applications 406 using application drivers.

PAN application server 404a is responsible for implementing user and terminal oriented services and enables thin terminals. In an embodiment of the present invention, PAN application server 404a implements such applications as a GUI 407, a remote terminal driver application, a location application, a telephony application or an equivalent thereof.

FIG. 5a, like FIG. 4, illustrates 1st and 2nd software component applications 406 and GUI 407.

A. PAN Router

PAN router 404c enables a fully meshed IP based network. In an embodiment of the present invention, each terminal can leverage the existing IP protocol, exchange data with other terminals and gain access to a WAN through PAN router 404c.

FIG. 5b illustrates software components of PAN router 404c. In an embodiment of the present invention, routing component 550, Bluetooth LAN access Profile component 551, Dynamic Host Configuration Protocol/Point-to-Point Protocol ("DHCP/PPP") component 552 and Network Address Translator ("NAT") component 553 are used in PAN router 404c. In an alternate embodiment, Domain Naming Service ("DNS") component 554, Tunneling and Optimization component 555 and Security component 556, singly or in combination are used in PAN router 404c.

1. Routing Component

Routing component 550 is implemented in Router 404c in order to realize a fully meshed IP network with access to a WAN. A routing component is responsible for imitating a fully meshed network based on a Master/Slave network.

Routing component 550 enables exchange of IP packets between two terminals, broadcasting of IP packets between all terminals on a PAN and routing of IP packets to and from a WAN.

2. Bluetooth™ LAN Access Profile ("LAP") Component

A Bluetooth™ LAN Access Profile ("LAP") component 551 is used in order to enable terminals to seamlessly use IP base networking. LAP component 551 enables terminals to exchange IP packets between themselves and PAN router 404c. LAP component 551 is implemented over a PPP serial Bluetooth™ connection. In an embodiment of the present invention, terminals, such as Smart terminals, include LAP chipsets.

3. DHCP/PPP Component

DHCP and PPP components 552 are used in order to enable an IP network. PPP realizes an IP network layered over LAP component 551.

DHCP component manages a PAN's IP address space and IP services, enabling terminals to get IP networking properties, such as an IP address for a terminal, an address of a DNS and an address of a default gateway device.

4. NAT Component

NAT component 553 translates a private IP address to and from a real IP address. Since mobile networks are typically capable of only providing a single IP address, the terminals will have to use private IP addresses supplied by NAT component 553.

5. DNS Component

DNS component 554 translates services between human readable names and IP addresses. DNS component 554 enables a terminal to query another terminal's address based on the other terminal's name and to query for the IP address of a named service on a WAN.

6. Tunneling and Optimization Component

Tunneling and Optimization component 555 allows terminals to use standard protocols. For example, accessing a WAN through a cellular GPRS/CDMA network using TCP/IP yields poor results because TCP/IP does not behave well over a bandwidth limited, high latency and high packet loss network, such as GPRS/CDMA.

Tunneling and Optimization component 555 is used to enable practical usage of IP in such networks. When using cellular, the tunnel will be between a mobile device having a PAN router and a landline operator's network. The tunneling and optimization network translates IP packets to more efficient transport methods for the specific access technology, and vice versa in a fully transparent fashion.

7. Security Component

Accessing a WAN can typically be done in two ways: unsecured when accessing a public network, such as the Internet, or secured when accessing a private network, such as an Enterprise network, file system or Exchange server.

Security component 556 is a centralized managed way for controlling access to a secured private WAN. In order to avoid each one of the terminals from implementing its own security scheme and methods, a centralized security component 556 is used. In an embodiment of the present invention, security component 556 is a firewall 556a, VPN 556b or URL filter 556c, singly or in combination.

8. Usage Scenario

In this scenario, a user is a traveling professional, who has a PDA and needs to synchronize the PDA against a corporate Exchange server while on the road. This synchronization needs to be done securely as the only way to enter the corporate network is via a certified and an information technology ("IT") manager approved VPN.

The user has a gateway device enabled handset with an embedded PAN router 404c and VPN client, which the IT manager installed.

As the user turns on the PDA, which is a Bluetooth™ equipped PDA with an LAP component 551, the PDA connects to a gateway device handset via the LAP. The PDA receives a local PAN IP address.

The user loads the PDA synchronization software, which is configured to synchronize against the corporate Exchange server. When hitting the "Synchronize" button, the PDA opens a TCP connection to the IP address of the corporate network.

The IP packets travel across the Bluetooth™ air interface to the handset using a PPP protocol. At the handset, the packets go through a NAT component and a local IP address is translated to a real Internet IP address. The real IP address goes to the VPN, which identifies the destination as the corporate LAN. The VPN packages the packet over its Internet tunnel, encrypts and signs it. The packet is then sent through the cellular air interface to the operator and the Internet, reaching the corporate VPN and Exchange servers. The PDA is totally unaware of this process.

B. PAN Server

PAN server 404b allows code to be downloaded to a PAN and executed in a central way. Similarly, PAN server 404b shares and stores data in a centralized manner.

1. PAN Server Interfaces

FIG. 6 illustrates software interfaces for PAN server 404b shown in FIG. 5a. PAN server 404b provides application program interfaces ("API") to applications 406. Applications 406 also queries PAN server 404b for specific services and/or terminal attributes in a PAN. Applications 406 provide at least three types of information to PAN server 404b. Applications 406 provide a Personal Identification Number ("PIN") number, network configuration information, service registration and un-registration information. PAN server 404a provides services and devices enumeration information to applications 406. In an embodiment of the present invention, a PIN number is an authorization code to enable a terminal to connect to a PAN.

PAN server 404b uses media abstraction layer 504 in order to communicate with terminals 107. PAN server 404b transfers services and devices enumerations to PAN router 404c; while, a terminal ID number is provided to PAN server 404b from PAN router 404c. A terminal ID is a unique code for identifying a particular terminal. Finally, a PIN number is transferred from PAN server 404b to PAN router 404c.

In an embodiment of the present invention, PAN server 404b loads an executable application software component to a selected terminal. Application server 404a retrieves the application software component locally from gateway device 106 memory or from either server 102 or 103 as illustrated in FIG. 1.

Backend middleware 485 provides a PIN number to router 404c. In an embodiment of the present invention, backend middleware 485 is stored on a server coupled to cellular network 105 shown in FIG. 1. In an embodiment of the present invention, backend middleware 485 is a software component for supplying PIN numbers and accessing application components for a particular terminal.

2. PAN Server Components

FIG. 7 illustrates software components of PAN server 404a according to an embodiment of the present invention: 1) plug and play software component 701, 2) PIN number management software component 702, 3) management software component 703, 4) service repository software component 704, and 5) application loader 705. In alternate embodiments, more or less components are used.

a. Plug and Play Component

When a new terminal is introduced to a PAN, the software to support this terminal needs to be located, downloaded and executed. The Plug and Play component is responsible for identifying the introduction of the new terminal and deciding on the software needed to be downloaded.

An example of the Plug and Play usage is when a new thin terminal, like a messaging terminal, is introduced to a PAN. The terminal itself, being thin, has no embedded application code or data. The appropriate software package (messaging software in this case) needs to be found, downloaded and executed. The Plug and Play component will identify the messaging terminal and resolve the needed software to support it.

FIG. 7 illustrates the operation of Plug & Play component 701. In response to a terminal ID from PAN router 404c, Plug and Play component 701 will access the software package for a selected terminal from backend middleware 485 or locally from gateway device 106 memory. If the selected package is not locally available in gateway device 106 memory, a URL is provided from backend middleware 485 for accessing the package remotely. In an embodiment of the present invention, the selected package will install and run on different modules (typically but not necessarily a shell, service/terminal drivers and applications that can run on the terminal).

b. Application Loader Component

Adding new capabilities to a PAN involves the loading of executable code to a PAN execution environment. Application loading can be a result of many events: plug and play component 701 can generate an application loading for supporting a new terminal on a PAN, a user can decide to actively load an application to a PAN or an operator on a cellular network can decide to load an application to a PAN. Application loader 705 is responsible for application software code transfer and execution.

c. PIN Number Management Component

Whenever gateway device 106 and a terminal become aware of each other, a pairing process takes place between them. For example, gateway device 801 and terminal 802 are paired as illustrated in FIG. 8a. When this pairing takes place for a first time (or when the link key that they were sharing has been lost in one or both sides for any reason), a claimant side (for example, gateway device 801) must know a PIN number of terminal 802 in order to carry out a successful pairing. PAN server 404b will supply PIN number information to PAN router 404c for that purpose. A PIN number is used to generate an initialization key that is used as an encryption key for the exchange of initial parameters between a gateway device and terminals. In an embodiment of the present invention, PAN server 404b must be able to supply PIN number information according to different criteria. For example, PAN server 404b supplies PIN numbers for only those terminals that are associated with a certain terminal class or ID number.

PAN server 404b will supply a PIN number upon an explicit request of another component, such as PAN router 404c. In an alternate embodiment, Application server 404b will supply PIN number information for terminals in order for them to establish a Bluetooth™ channel with other terminals without a gateway device 107 as a mediator.

In an embodiment of the present invention, PIN numbers are available from backend middleware 485. In alternate embodiments of the present invention, applications 406 provide a PIN number. For example, an application may allow a user to enter a PIN number or an application may cause backend middleware 485 to generate a PIN number. In an embodiment of the present invention, an application that supplies a PIN number states its origin.

There are two methods for obtaining PIN numbers. First, a push method occurs when the source of the PIN number transfers the PIN number when it becomes available. Second, a query method occurs when router 404c queries the source of the PIN number for a PIN number according to a certain criteria. A push method is preferred because it enables an immediate response to a request for a PIN number. However, if the PIN number is not available when a request arrives at the source of the PIN number, PAN server 404b attempts to obtain the PIN number using the query method. When the push method is used, the stimulus comes from the PIN number information source.

PIN number management software component 702 maintains a local database of PIN numbers with some attributes. An attribute may include a terminal class or terminal ID. PIN number management software component 702 adds, deletes and retrieves PIN numbers from the database. PIN number software component 702 also may retrieve all PIN numbers associated with a screen terminal class. In an embodiment, PIN number management software component 702 will have a persistent database. In an alternate embodiment, PIN number management software component 702 will not have a persistent database.

In alternate embodiments of the present invention, PIN number management 702 is a central storage location for PAN databases and/or caching. The storage component supports implementation of a file system that can be accessed by a terminal. Also, a storage component may have automatic backup to a backend server or transparent storage.

d. Network Management Component

Management software component 703 provides functions to configure a PAN.

First, management software component 703 provides a disconnect service function that forces specific applications to disconnect from a specific service.

Second, management software component 703 provides a disconnect terminal function that forces specific applications to disconnect from all services of a specific terminal.

Third, management software component 703 provides a disable service function that halts any usage of a specific terminal's service.

Fourth, management software component 703 provides a disable terminal function that halts any usage of all services of a specific terminal.

The disconnecting functions described above allow a high priority application to obtain a service from an application using the service. The disabling functions allow for high priority applications to create personal area network restrictions.

Service repository software component 704 is used to cease offering services. PIN Number management 702 is used to delete a PIN number and abstraction layer I/O is used to halt service's data traffic.

e. Enumeration or Service Repository Component

Service repository software component 704 allows applications 406, which run on a gateway device 106 or terminals 107, to discover what services are offered by a PAN, and to determine the characteristics of the available services. The service could be offered by remote terminal, such as an application in terminal 806 illustrated in FIG. 8*b*. For example, terminal 806 could be a printer having a printing service. Also, the service could be offered by an application stored on gateway device 106, such as the application in gateway device 801 illustrated in FIG. 8*a*. For example, gateway device 801 is a cellular telephone having a telephony service provided by a cellular telephone application. Remote services are offered with the assistance of service logical drivers (SLDs) that are stored on gateway device 106. Whenever an application is interested in using a terminal service, the terminal interoperates with the corresponding gateway device SLD. For example, an application on terminal 809, shown in FIG. 8*b*, accesses a driver in gateway device 805 for a service provided by an application on terminal 806. Therefore, from an application's point of view, the SLD of the remote service acts the same way as a local application.

Service repository software component 704 offers a plurality of functions.

First, service repository software component 704 provides service registration of a service offered by application, or a hardware capability offered by terminal driver.

Second, service repository software component 704 provides service un-registration that cancels a registered service.

Third, service repository software component 704 provides registered services that suit a specific class.

Fourth, service repository software component 704 also provides searching of services. This function describes whether listed terminals support listed services. This function enables an application to quickly locate a specific service. A search of a general class of service, such as a search for a printer, may be performed. Likewise, a search for specific attributes associated with that service, for example laser or color, is provided. Further, a search for specific instance of a service, for example a HP LaserJet model GTI, is also provided.

Fifth, service repository software component 704 provides the capability of describing the participating terminals in a personal area network. The existence of these terminals is derived from a service registration function.

Sixth, service repository software component 704 provides a disabling function that ceases offering an unfriendly service.

Seventh, service repository software component 704 also provides an enabling function that cancels service disabling.

Eighth, service repository software component 704 provides a terminal disabling function that ceases offering all the services associated with an unfriendly terminal.

Ninth, service repository software component 704 provides a terminal enabling function that cancels terminal disabling.

In an embodiment, an application does not have to discover a service in order to connect with a terminal. If an application has previous knowledge of a terminal's service, the application needs to only search for the specific terminal.

In an embodiment of the present invention, service repository component 704 describes the terminals and the services that are available at a particular time, but service repository software component 704 does not describe the current status of the services. A service might be available in a PAN but not necessarily accessible since another application is exclusively using the service.

Since service repository software component 704 operates with local and remote applications, a uniform interface is used. In an embodiment of the present invention, remote applications use a Bluetooth™ Service Discovery Protocol ("SDP") to discover what services gateway device 106 offers. Similarly, local applications use SDP in an embodiment of the present invention.

C. Application Server

Application Server component 404*a* illustrated in FIG. 5*a* allows for removing redundant capabilities from terminals and consolidating them in a centralized application server. This allows significant added value in minimizing the cost and complexity of the terminals in a PAN, as well as making their design intuitive and easy to use.

In an embodiment of the present invention, application server component 404*a* includes two components: 1) an execution environment and 2) services for being able to successfully execute software on a multi-terminal PAN, such as a file system.

Thin terminals, being optimized for low cost will not include an IP capability in most cases. Instead, they will use the native protocols offered by the PAN's physical layer. This does not conflict with the PAN router 404*c* since thin terminals are an extended remote I/O for applications running on a PAN application server 404*a*. All the logic, protocols and standard compatibility is implemented in the application server, in which standard protocols like IP are implemented and used.

1. Usage Scenario

In an embodiment of the present invention, a thin messaging terminal includes a color Liquid Crystal Display ("LCD"), QWERTY keypad, Bluetooth™ chipset and a small software stack for displaying graphical screens received over the Bluetooth™ air interface and transmit keypad actions back over the Bluetooth™ air interface.

When a terminal is turned on for the first time, a Plug and Play component 701 in the gateway device 106 identifies that this is a new terminal. Gateway device 106 communicates with Plug and Play component 701 in order to retrieve the needed software package to be executed on an application server 404a. In an embodiment of the present invention, a Plug and Play component 701 contains a URL for a chatting application package.

Application loader 705 gets the URL and loads the new package to PAN application server 404a in a gateway device 106 and executes the chatting software application. The chatting application software identifies the messaging device by enumerating a PAN for terminals and capabilities, and attaches itself to the right remote graphical driver and the remote keypad driver.

Now, all user interactions for the chatting application is displayed on the messaging terminal, and the keypad entries on the terminal are sent to the chatting application.

In this embodiment of the present invention, the terminal is used only for I/O and user interaction. The actual chatting logic is executed in application server 404a, which is located in gateway device 106.

IV. Gateway Device/Terminal Operations

A. Terminal Joins Personal Area Network

First, PAN router 404c requests a PIN number from PIN number management component 702. Second, if a PIN number is available, PIN number management 702 transfers the PIN number to PAN router 404c. Otherwise, PIN number management 702 attempts to obtain the PIN number from other sources, such as applications 406 or backend middleware 485, and transfers the PIN number to PAN router 404c. Third, PAN router 404c notifies plug and play 701 that a pairing has ended and delivers a terminal ID to plug and play 701. Fourth, plug and play 701 resolves the terminal package URL with backend middleware 485 if a package is not locally available; otherwise, the package is loaded and executed. Finally, if the package contains drivers, the driver's services are offered to service repository 704.

B. Pin Number Received

Backend middleware 485 or an application acquires a PIN number. Second, the acquired PIN number is offered to PIN number management 702 by either backend middleware 485 or applications 406. In an alternate embodiment of the present invention, a PIN number is offered with additional characteristics of the associated terminal. PIN number information is then accepted and stored with the attributes in a database of PIN number management 702.

C. Gateway Device Application Queries for a Specific Service

There are two methods for a gateway device 106 application to inquire for a specific service. The first terminal method includes the application asking service repository 704 to describe the terminals in the current personal area network and to describe whether any of these terminals provide the requested service. In an embodiment of the present invention, an application sorts the available terminals in order of preference. The application then queries abstraction layer I/O whether the most preferred terminal's service is available.

The second service method includes an application querying service repository 704 to provide the registered services that suit a requested service class. The application then searches the registered services to determine which capabilities are provided by the registered services. In an embodiment of the present invention, an application sorts the available services in order of preference. The application then queries abstract layer I/O whether the most preferred service is available.

D. Terminal Application Queries for a Gateway Device Service

Media abstraction layer 504 obtains an SDP of a remote terminal application. Media abstraction layer 504 passes the SDP call to service repository 704. Service repository 704 answers media abstraction layer 504, using SDP, according to services that are registered. The abstraction layer 504 then sends the answers to an application on remote terminal.

In an alternate embodiment, service repository 704 pushes new services to a Bluetooth™ stack SDP database. The Bluetooth™ stack replies automatically and generates an SDP request.

E. High Priority Application Prevents Terminal Usage

In response to a network configuration signal from a high priority application in applications 406, management component 703 generates a delete PIN number signal to PIN number management component 702 which deletes the PIN number associated with the selected terminal. Management component 703 generates a disable signal to service repository component 704 to cease offering all the services associated with the selected terminal. Management component 703 generates a disable service signal to abstraction layer I/O in order to halt all the transport to and from the selected terminal's services.

Abstraction layer I/O sends halt notifications to the applications that are currently using the selected terminal's services. Abstraction layer I/O then stops any data transport to and from the selected terminal's services.

V. Conclusion

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A wireless device comprising:

a processor;

a memory, coupled to the processor, to store instructions for generating a short-range radio signal, processing user information, and providing a plurality of services; and an antenna, coupled to the processor, to generate the short-range radio signal responsive to the instructions and the processor, wherein the wireless device is configured to communicate with a wireless gateway device over a short-range wireless network, and wherein the wireless gateway device is configured to:

route information received by the wireless gateway device over a wide area network to the wireless device over the short-range wireless network using a public Internet Protocol (IP) address;

route information received by the wireless gateway device over the short-range wireless network from the wireless device to one or more destinations over the wide area network using the public IP address;

route information received by the wireless gateway device over the short-range wireless network from the wireless device to one or more destinations over the wide area network using the public IP address;

route information received by the wireless gateway device over the short-range wireless network from the wireless device to one or more other devices over the short-range wireless network using the private IP address;

provide the wireless device with the ability to share one or more services with the other devices;

provide the wireless device with the ability to add to, update, or otherwise manage the shared services; and provide the wireless device with a security management mechanism.

2. The wireless device of claim 1, wherein the wireless device comprises a single processor.

3. The wireless device of claim 1, wherein the wireless device is a messaging terminal.

4. The wireless device of claim 1, wherein the wireless device is selected from a group consisting of a desktop computer, a laptop computer, a personal digital assistant, a headset, a pager, a printer, a watch, a digital camera and an equivalent thereof.

5. The wireless device of claim 1, wherein the wireless device further comprises a 2.4 GHZ Bluetooth ™ transceiver coupled to the processor and the antenna.

6. The wireless device of claim 1, wherein the wireless device further comprises a 5.7 GHZ Bluetooth ™ transceiver coupled to the processor and the antenna.

7. The wireless device of claim 1, wherein the wireless device further comprises a keypad, coupled to the processor, for inputting information.

8. The wireless device of claim 1, further comprising: a display, coupled to the processor, to present the user information responsive to the instructions and the processor.

9. The wireless device of claim 1, further comprising: a speaker, coupled to the processor, to present the user information responsive to the instructions and the processor.

10. The wireless device of claim 1, further comprising: a microphone, coupled to the processor, for inputting information.

11. The wireless device of claim 1, further comprising: a touchscreen, coupled to the processor, for inputting information.

12. The wireless device of claim 1, wherein the short-range radio signal is a Bluetooth ™ signal.

13. The wireless device of claim 1, wherein the short-range radio signal is an 802.11 signal.

14. The wireless device of claim 1, wherein the short-range radio signal is a HomeRF signal.

15. A system comprising:
a wireless device configured to communicate with a wireless gateway device over a short-range wireless network, the wireless device comprising:
  a processor;
  a memory, coupled to the processor, to store instructions for generating a short-range radio signal, processing user information, and providing a plurality of services; and
  an antenna, coupled to the processor, to generate the short-range radio signal responsive to the instructions and the processor; and the wireless gateway device configured to:
route information received by the wireless gateway device over the short- range wireless network from the wireless device to one or more destinations over the wide area network using the public IP address;
route information received by the wireless gateway device over the short- range wireless network to the wireless device over the short-range wireless network using a private IP address;
route information received by the wireless gateway device over the short- range wireless network from the wireless device to one or more other devices over the short-range wireless network using the private IP address;
provide the wireless device with the ability to share one or more services with the other devices;
provide the wireless device with the ability to add to, update, or otherwise manage the shared services; and
provide the wireless device with a security management mechanism.

16. The system of claim 15, wherein the wireless gateway device communicates with the cellular network using a Global System for Mobile Communications ("GSM") protocol.

17. The system of claim 15, wherein the wireless gateway device communicates with the cellular network using a Code Division Multiple Access ("CDMA") protocol.

18. The system of claim 15, wherein the wireless gateway device communicates with the cellular network using a Code Division Multiple Access ("CDMA") 2000 protocol.

19. The system of claim 15, wherein the wireless gateway device communicates with the cellular network using a Time Division Multiple Access ("TDMA") protocol.

20. The system of claim 15, wherein the processor is the only processor in the second wireless device.

21. The system of claim 15, wherein the processor is a low power processor.

22. The system of claim 15, wherein the wireless device is a messaging terminal.

23. The system of claim 15, wherein the wireless device is selected from a group consisting of a desktop computer, a laptop computer, a personal digital assistant, a headset, a pager, a printer, a watch, a digital camera and an equivalent thereof.

24. The system of claim 15, wherein the wireless device further comprises a 2.4 GHZ Bluetooth ™ transceiver coupled to the processor and the antenna.

25. The system of claim 15, wherein the wireless device further comprises a 5.7 GHZ Bluetooth ™ transceiver coupled to the processor and the antenna.

26. The system of claim 15, wherein the wireless device further comprises a keypad, coupled to the processor, for inputting information.

27. The system of claim 15, further comprising: a display, coupled to the processor, to present the user information responsive to the instructions and the processor, wherein the processor in a Bluetooth ™ processor.

28. The system of claim 15, further comprising: a speaker, coupled to the processor, to present the user information responsive to the instructions and the processor.

29. The system of claim 15, further comprising: a microphone, coupled to the processor, for inputting information.

30. The system of claim 15, further comprising: a transceiver, coupled to the processor, to present the user with information responsive to the instructions and the processor.

31. The system of claim 15, wherein the short-range radio signal is a Bluctooth ™ signal.

32. The system of claim 15, wherein the short-range radio signal is an 802.11 signal.

33. The system of claim 15, wherein the short-range radio signal is a HomeRF signal.

* * * * *

UNITED STATES PATENT AND TRADEMARK OFFICE
CERTIFICATE OF CORRECTION

PATENT NO. : 7,551,590 B2
APPLICATION NO. : 10/165150
DATED : June 23, 2009
INVENTOR(S) : Amit Haller et al.

Page 1 of 1

It is certified that error appears in the above-identified patent and that said Letters Patent is hereby corrected as shown below:

In the Claims

Column 14, lines 63-65, delete "from the wireless device to one or more destinations over the wide area network using the public IP address;" and insert the following text in its place --to the wireless device over the short-range wireless network using a private IP address;--.

Column 15, after the subparagraph ending with "configured to:" in line 58 and before line 59, insert the following subparagraph --route information received by the wireless gateway device over a wide area network to the wireless device over the short-range wireless network using a public Internet Protocol (IP) address;--.

Signed and Sealed this
Twenty-second Day of March, 2016

Michelle K. Lee
*Director of the United States Patent and Trademark Office*